3,176,005
9-NUCLEOSIDE-6-THIOHETEROCYCLES AND METHOD OF MAKING

George H. Hitchings, Yonkers, and Gertrude B. Elion, Bronxville, N.Y., assignors to Burroughs Wellcome & Co. (U.S.A.) Inc., Tuckahoe, N.Y., a corporation of New York
No Drawing. Filed Feb. 12, 1963, Ser. No. 257,884
4 Claims. (Cl. 260—211.5)

This invention relates to novel derivatives of 6-mercaptopurines and the preparation thereof, and is an improvement in or modification of the invention of British specification 878,646.

U.S. Patent 3,056,785 describes the unexpectedly high antibacterial activity of these 6-thioheterocyclic purines on certain pathogenic bacteria for which adequate control measures had been non-existent. The compounds are indicated to be especially valuable by reason of the synergistic action which is exhibited on infectious and pathogenic organisms when they are used in combination with a sulfonamide or other antagonists of p-aminobenzoic acid such as diaminodiphenylsulfone (DDS). The combinations may be further combined with antibiotics to form antibacterial preparations for topical use in various ways which are apparent to those versed in the art.

In the following formulae, X is a hydrogen atom or an amino group, Z is a chain of 3 or 4 atoms, of which one is carbon, nitrogen or sulfur and the remainder are carbon, completing an unreduced 5- or 6-membered heterocyclic ring in which nitrogen atoms may bear alkyl groups having from 1 to 4 carbon atoms or aralkyl groups having from 7 to 10 carbon atoms which may be aromatically substituted by nitro groups, carbon atoms may bear halogen atoms or methyl, amino, nitro or hydroxy groups, two adjacent carbon atoms may bear a fused benzene or imidazole ring and one carbon atom adjacent to a nitrogen atom in the ring may bear a further 6-purinylthio or 2-amino-6-purinylthio group, and R is an alkyl group having from 1 to 4 carbon atoms or an aralkyl group having from 7 to 10 carbon atoms.

It has now been found that the ribonucleosides, for example, 9-β-D-ribofuranosyl derivatives of the S-heterocyclic 6-thiopurines of Formula I have antibacterial activities and substantial advantages over the parent compounds. Whereas the compounds of Patent 3,056,785 are almost insoluble, the ribonucleosides are much more soluble and thus amenable to the preparation of solutions for various purposes. Having the 9-β-D-ribofuranosyl group, for example, they may be regarded as intermediates in the formation of the ribonucleosides of the 6-mercaptopurines.

According to this invention there are provided the novel S-heterocyclic 6-thiopurine ribonucleotides of the Formula I, and in particular the S-imidazoyl 6-thiopurine ribonucleosides of Formula II.

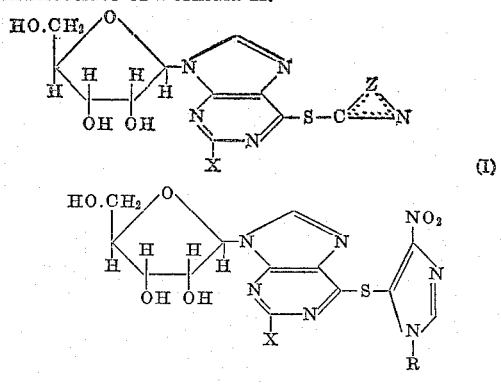

The heterocyclic 6-thiopurine nucleosides of Formula I may be made by the reaction (with elimination of hydrogen halide) of a purine nucleoside of Formula III or its Tri-O-acylated derivative with a heterocyclic derivative of Formula IV, followed where necessary by the hydrolysis of the O-acyl groups in the product.

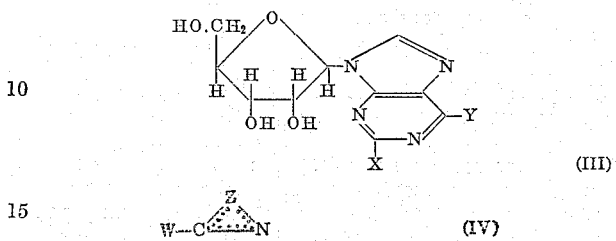

In these formulae, one of W and Y is a mercapto group and the other is a chlorine, bromine or iodine atom.

The reaction is conveniently performed in a solvent of high dielectric constant in the presence of a proton acceptor at a temperature not exceeding 130°. The subsequent removal of the O-acyl groups from the product may be accomplished with ammonia.

This invention in another aspect provides pharmaceutical formulations containing an S-heterocyclic 6-thiopurine nucleoside of Formula I. The compound may advantageously be presented in discrete units, such as tablets, capsules, cachets, ampoules or suppositories, each containing a predetermined amount of the compound. It may also be presented as a powder or granules, or as a solution or suspension in an aqueous, non-aqueous or emulsified liquid. For parenteral use, the formulations must be sterile and are presented in sealed containers. The formulations of this invention may be made by any of the methods of pharmacy, and may include one or more of the following accessory ingredients: diluents, solutes, buffers, flavoring, binding, dispersing, surface-active, thickening, lubricating, and coating materials, preservatives, antioxidants, bacteriostats, and and other acceptable excipients.

The following examples illustrate the invention. Temperatures are in degrees Celsius.

Example 1

A mixture of 450 mg. of 2-amino-6-mercapto-9-β-D-ribofuranosylpurine (6-thioguanosine), 242 mg. of 5-chloro-1-methyl-4-nitroimidazole, 130 mg. of anhydrous sodium acetate and 10 ml. of dry dimethylsulphoxide was heated at 100° for 7 hours. After cooling, the mixture was treated 4 times with 50 ml. portions of anhydrous ether, the ether layer being removed by decantation each time. The gummy residue was heated with 20 ml. of absolute ethanol, cooled, and diluted with 20 ml. of ether. The precipitate of crude product (425 mg.) was collected and recrystallized from 90 ml. of boiling water to give 390 mg. of pure 2-amino-6-(1-methyl-4-nitroimidazol-5-ylthio)-9-β-D-ribofuranosylpurine, M.P. 208–209° It showed maximum ultraviolet absorption at 315 mµ at pH1 and at 312 mµ at pH 11.

Example 2

A mixture of 4 g. of 6-thioguanosine, 2.2 g. of 5-chloro-1-methyl-4-nitroimidazole, 1.8 g. of anhydrous potassium carbonate and 40 ml. of dry dimethylformamide was heated at 80–90° for 5 hours. The reaction mixture was filtered to remove inorganic salts. The filtrate was diluted with 150 ml. of water and chilled. The precipitate of crude product (4.7 g.) was collected and washed with water. The solid was suspended in 50 ml. of water containing 1 ml. of 2 N sodium hydroxide to dissolve out any unchanged 6-thioguanosine. The solid residue was filtered off and recrystallized from 350 ml. of boiling water with the addition of charcoal to give 3.4 g. of pure 2-amino-6-(1-methyl-4-nitroimidazol-5-ylthio)-9-β-D-ribofuranosylpurine, identical in all respects with the product of Example 1.

*Example 3*

A mixture of 5 g. of 9-(2,3,5-tri-O-acetyl-β-D-ribofuranosyl)-6-mercaptopurine (2′,3′,5′-tri-O-acetyl-6-thioinosine), 1.97 g. of 5-chloro-1-methyl-4-nitroimidazole, 1.6 g. of anhydrous sodium acetate and 25 ml. of dry dimethylsulphoxide was heated at 100° for 4 hours. The mixture was cooled and poured over 200 g. of crushed ice. The precipitate that formed was collected and dissolved in 200 ml. of chloroform. The chloroform solution was washed with three 100 ml. portions of water and then dried over sodium sulphate. The chloroform was removed under reduced pressure, and the viscous yellow residue was dissolved in 50 ml. of anhydrous ether and chilled to give 2.5 g. of 9-(2,3,5-tri-O-acetyl-β-D-ribofuranosyl)-6-(1-methyl-4-nitroimidazol - 5-ylthio)purine as yellow crystals, M.P. 80–85°. It showed maximum ultraviolet absorption at 278 m$\mu$ at both pH 1 and pH 11.

A solution of 2.4 g. of 9-(2,3,5-tri-O-acetyl-β-D-ribofuranosyl)-6-(1-methyl-4-nitroimidazol-5 - ylthio)purine in 75 ml. of absolute ethanol was saturated with ammonia at −40°. The solution was kept at −40° for 24 hours and then evaporated to dryness under reduced pressure. The residue was dissolved in 50 ml. of water and the solution was adjusted to pH 6 by the addition of glacial acetic acid. The solution was treated with charcoal, filtered, concentrated in vacuo to 20 ml., and chilled to give 0.7 g. of 6-(1-methyl-4-nitroimidazol-5-ylthio)-9-β-D-ribofuranosylpurine as yellow crystals, M.P. 169–171°. It showed maximum ultraviolet absorption at 279 m$\mu$ at pH 1 and at 280 m$\mu$ at pH 11.

What we claim is:

1. A compound of the formula

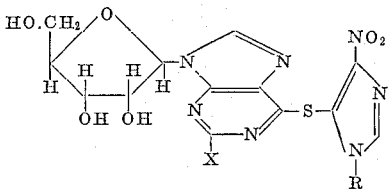

wherein X is selected from the class consisting of hydrogen and an amino group, R is selected from the class consisting of an alkyl group having from 1 to 4 carbon atoms and an aralkyl group having from 7 to 10 carbon atoms.

2. 2-amino-6-(1-methyl-4-nitroimidazol-5-ylthio) - 9-β-D-ribofuranosylpurine.

3. 9 - (2,3,5-tri-O-acetyl-β-D-ribofuranosyl) - 6 - (1-methyl-4-nitroimidazol-5-ylthio)purine.

4. 6-(1-methyl-4-nitroimidazol-5-ylthio)-9 - β - D-ribofuranosylpurine.

References Cited in the file of this patent
UNITED STATES PATENTS
3,074,930    Hitchings et al. _____ Jan. 22, 1963

FOREIGN PATENTS
878,646    Great Britain _____ Oct. 4, 1961